United States Patent [19]

Nakanishi et al.

[11] 4,021,508

[45] May 3, 1977

[54] VINYL CHLORIDE -EPDM RESIN COMPOSITIONS

[75] Inventors: Kakusaburo Nakanishi, Uozu; Tatsuro Yoshida, Namerikawa; Kyoku Nakatubo, Kurobe, all of Japan

[73] Assignee: Ryo-Nichi Co., Ltd., Tokyo, Japan

[22] Filed: July 7, 1975

[21] Appl. No.: 593,488

[30] Foreign Application Priority Data

July 5, 1974 Japan .............................. 49-77070

[52] U.S. Cl. .................. 260/876 R; 260/23 XA; 260/45.75 J; 260/45.75 K; 260/45.75 W; 260/878 R
[51] Int. Cl.$^2$ ..................................... C08L 51/04
[58] Field of Search ........................... 260/876, 878

[56] References Cited

UNITED STATES PATENTS

| 3,408,424 | 10/1968 | Barkhuff | 260/878 R |
|---|---|---|---|
| 3,891,720 | 6/1975 | Severini et al. | 260/878 R |

FOREIGN PATENTS OR APPLICATIONS 2,163,573  8/1973  France

*Primary Examiner*—Carman J. Seccuro
*Attorney, Agent, or Firm*—Bierman & Bierman

[57] ABSTRACT

This invention relates to a vinyl chloride resin composition excellent in weather resistance and impact resistance. More particularly, the invention pertains to a weather resistant and impact resistant vinyl chloride resin composition low in cost and markedly improved in processability which comprises a vinyl chloride resin and a vinyl chloride graft copolymer prepared according to a specific process by graft-copolymerizing a vinyl chloride monomer on an ethylene-propylene-diene copolymer.

6 Claims, No Drawings

VINYL CHLORIDE -EPDM RESIN COMPOSITIONS

It has heretofore been well known that a composition, obtained by mixing a vinyl chloride resin with a vinyl chloride graft copolymer prepared by graft-copolymerizing a vinyl chloride monomer on an ethylene-propylene-diene copolymer (hereinafter abbreviated to "EPT elastomer"), is a vinyl chloride resin composition excellent in weather resistance and impact resistance (refer to Japanese Pat. Publication No. 662/1967). However, even when a vinyl chloride resin is mixed with an EPT elastomer-containing graft copolymer prepared according to such ordinary process as mentioned above, no composition excellent in processability can be obtained, and thus the said process has not been put into commercial practice.

As processes for producing impact resistant vinyl chloride resins containing EPT elastomers, there have been generally known, process in which a graft copolymer high in content of EPT elastomer is prepared and is blended with a vinyl chloride resin, and a process in which a graft copolymer less in content of EPT elastomer is prepared and is used as it is. A comparison in economy between the impact resistant vinyl chloride resins obtained by the said two processes shows that when the content of EPT elastomer is made same in order to obtain resins identical in impact resistance value with each other, the resin of the former process is not only obtainable at a far lower cost than that obtained by the latter process, but also can be varied in blending amount as occasion demands using one graft copolymer, and thus is advantageous in handling. From this, there is demanded a vinyl chloride graft copolymer modifier high in content of EPT elastomer. However, even when a vinyl chloride graft copolymer high in content of EPT elastomer is prepared with reference to the known processes for producing graft copolymers less in content of EPT elastomer which are disclosed in, for example, Japanese Pat. Publication Nos. 13260/1967, 28787/1970 and 19898/1972, and even when the thus prepared modifier is mixed with a vinyl chloride resin, no weather resistant and impact resistant vinyl chloride resin composition excellent in processability can be obtained.

In view of such technical state as mentioned above, the advent of a weather resistant and impact resistant vinyl chloride resin composition containing an EPT elastomer which is low in cost and excellent in processability is desired. However, no resin composition that is truly excellent in processability has been found yet.

Further, from the standpoint of prevention of environmental pollution, a rigid vinyl chloride resin has recently been required to be blended with a so-called non-toxic stabilizer without using such toxic stabilizer as lead or cadmium. On the other hand, a weather resistant and impact resistant vinyl chloride resin composition has also been required to be blended with a non-toxic stabilizer excellent in processability. It is well known in general that when subjected to extrusion molding, a vinyl chloride resin or a composition comprising an impact resistant modifier and a vinyl chloride resin, which resin or composition has been incorporated with a tin or calcium-zinc type non-toxic stabilizer, is inferior in processability to one which has been incorporated with such stabilizer as lead or cadmium. However, even when a tin or calcium-zinc type non-toxic stabilizer is added to a high viscosity mixture comprising a vinyl chloride resin and a modifier high in content of EPT elastomer which has been prepared by a known process, the resulting composition is too low in processability to give a satisfactory molded article.

An object of the present invention is to provide a well-processable, weather resistant and impact resistant vinyl chloride resin composition comprising a vinyl chloride resin and a vinyl chloride graft copolymer high in content of EPT elastomer, which composition has overcome the above-mentioned disadvantages.

Another object of the invention is to provide a non-toxic, weather resistant and impact resistant vinyl chloride resin composition capable of being easily molded into pipes and the like.

From the viewpoint that a composition comprising a vinyl chloride resin and a vinyl chloride graft copolymer high in content of EPT elastomer will be put into practical use as a weather resistant and impact resistant modifier from the economical standpoint, we made extensive studies on the improvement in processability of this kind of composition to find that a composition comprising a vinyl chloride resin and a graft copolymer obtained by a certain specific polymerization process can be greatly improved in processability. We further conducted various studies on a non-toxic blending composition employed at the time when the said composition is put into practical use to find that when an EPT-containing vinyl chloride graft copolymer obtained by the above-mentioned specific polymerization process is used, it is possible to obtain a well-processable composition high in compatibility with a non-toxic stabilizer which can display prominent effect particularly when molded into pipes. Based on the above findings, we have accomplished the present invention.

Thus, in accordance with the present invention, there are provided a well-processable, weather resistant and impact resistant vinyl chloride resin composition comprising a vinyl chloride resin and a vinyl chloride graft copolymer containing 10 to 60 wt% of EPT which is obtained by graft-polymerizing according to suspension polymerization a vinyl chloride monomer on an EPT elastomer in the aqueous phase in the presence of an aliphatic alcohol of not less than 8 carbon atoms; and a non-toxic, well-processable, weather resistant and impact resistant vinyl chloride resin composition comprising the said composition and tin type and/or calcium-zinc type stabilizers.

The vinyl chloride graft copolymer high in content of EPT elastomer, which is used in the present invention, is a copolymer produced by a process comprising graft-polymerizing a vinyl chloride monomer onto 10 to 60 wt% of an EPT elastomer, wherein the graft-polymerization is carried out according to suspension polymerization in the aqueous phase in the presence of an aliphatic alcohol of not less than 8 carbon atoms. This copolymer is a white and opaque graft copolymer excellent in processability, and is greatly different in properties from a graft copolymer produced by the prior art process.

The aliphatic alcohol used in the above-mentioned graft polymerization is one which has not less than 8 carbon atoms, preferably not less than 12 carbon atoms. Examples of such aliphatic alcohols include lauryl alcohol, stearyl alcohol and palmityl alcohol. These may be used either singly or in the form of mixture of two or more members. The said aliphatic alcohol is sometimes added during processing of vinyl chloride resin. In this case, even if the aliphatic alcohol is added to a mixture of EPT elastomer and vinyl chloride resin, no improvement in processability can be attained as described in the examples shown later. In short, a white graft copolymer uniform in particle size can be obtained only in the case where the said aliphatic alcohol is used at the time of graft copolymerization of a vinyl chloride monomer on an EPT elastomer, like in the present invention. Only when this graft copolymer is used, it is possible to obtain the desired excellent composition of the present invention which is quick in gelation; is greatly improved in decomposition time by means of a plastograph, i.e. in kinetic thermal stability, and in Geer's oven blackening time, i.e. in static thermal stability; is easily moldable into pipes or the like; is well compatible with a non-toxic stabilizer; and can display physical property-improving effect.

The said graft copolymer used in the present invention contains 10 to 60 wt% of an EPT elastomer. If the content of said EPT elastomer is less than 10 wt%, the graft copolymer should be used in large quantities for production of the desired impact resistant composition to bring about economical disadvantage. On the other hand, if the content of said elastomer is more than 60 wt%, the graft copolymer becomes not uniform in particle size and becomes low in compatibility with a vinyl chloride resin to make it impossible to obtain a composition excellent in processability.

The EPT elastomer employed in preparing the graft copolymer used in the present invention is an ethylene-propylene copolymer containing a small amount of a diene compound, and contains 20 to 50 wt% of propylene. The said diene compound includes cyclopentadiene, ethylidenenorbornene, methylenenorbornene and 1,4-hexadiene, and the content thereof is 30 or less in terms of iodine value. The polymerization degree of the said elastomer is preferably from 20 to 120 in terms of Mooney viscosity.

The graft copolymer used in the present invention is a graft copolymer prepared by graft-polymerizing on the above-mentioned EPT elastomer a vinyl chloride monomer, either alone or in admixture with a small amount of other monomer copolymerizable therewith. Examples of the said other monomer include olefins such as ethylene and propylene; vinyl esters such as vinyl acetate and vinyl stearate; vinyl ethers such as methyl vinyl ether and cetyl vinyl ether; acrylic and methacrylic acids, and their esters wuch as octyl acrylate and methyl methacrylate; organic acids and their anhydrides and esters such as maleic acid, fumaric acid, maleic anhydride and dioctyl fumarate; vinyl halides such as vinylidene chloride and vinyl bromide; and nitrile compounds such as acrylonitrile.

The graft copolymer used in the present invention is a copolymer prepared according to suspension polymerization in the aqueous phase, and may be any of suspension polymerization graft copolymers obtained at a usual polymerization temperature using a polymerization initiator and a dispersant which are ordinarily employed in the suspension polymerization of vinyl chloride. As the dispersant, there may be used any of water-soluble dispersants which are employed in ordinary suspension polymerization of vinyl chloride, e.g. polyvinyl alcohols, celluloses such as methyl cellulose and hydroxyethyl cellulose, vinyl acetate-maleic acid copolymers, polyvinyl pyrrolidones and gelatin. The said water-soluble dispersant may be used in combination with an oil-soluble dispersant such as ethyl cellulose. The amount of the dispersant used is preferably 0.01 to 2 wt% based on the amount of vinyl chloride.

As the polymerization initiator, there may be used any of such oil-soluble polymerization initiators as lauroyl peroxide, benzoyl peroxide, 3,5,5-trimethylhexanoyl peroxide, tert-butyl peroxypivalate, di-2-ethylhexyl peroxydicarbonate, azobisisobutyronitrile and azobisvaleronitrile, and initiators employed in the ordinary suspension polymerization of vinyl chloride.

In order to impart a desired impact resistance to a composition comprising the aforesaid graft copolymer and a vinyl chloride resin, the graft copolymer should have such a uniform and proper particle size as to easily disperse in the vinyl chloride resin. From this, it is desirable to adopt, in the production of suspension polymerization graft copolymer, a process in which a graft copolymer having a uniform particle size can be obtained.

A graft copolymer obtained according to emulsion polymerization is desirably not used in place of the graft copolymer used in the present invention, because it cannot be produced unless an EPT elastomer emulsion prepared by a specific process is used, and thus is costly. Further, the said graft copolymer should necessarily be subjected to after-treatment, with the result that the steps become complex to bring about a cause for increase in production cost. Moreover, it is excessively fine in particle size, and hence cause dusting at the time of processing and is undesirably low in thermal stability.

In the composition of the present invention, there is used any of various known stabilizers that have heretofore been used for the processing of vinyl chloride. As mentioned previously, a composition incorporated with a non-toxic stabilizer has recently been demanded. However, it is well known that a composition comprising a vinyl chloride resin and a rubbery modifier is low in processability, in general, and is difficultly processed into pipes or the like by extrusion molding, and that a composition incorporated with a tin or calcium-zinc type non-toxic stabilizer is more viscous and more difficultly injection moldable than a composition incorporated with a lead or cadmium type toxic stabilizer. Such disadvantages are particularly marked when MBS, for example, is used as a modifier for vinyl chloride resin, and, actually, no pipe obtained from a composition incorporated with a non-toxic stabilizer has yet been put into practical use. While the aforesaid graft copolymer used in the present invention gives a well-processable composition when incorporated with a lead or cadmium type stabilizer, what is more surprising is that even when incorporated with tin and/or calcium-zinc type stabilizers, the graft copolymer shows excellent compatibility with the stabilizers to give a composition which is far more easily moldable into pipes or the like than in the case where a conventional modifier is used. It is therefore preferable to use the said tin and/or calcium-zinc type stabilizers. Such effect as mentioned above was entirely unimaginable in the molding of ordinary vinyl chloride resins. The amount of the stabilizer used may be a conventional amount adopted in the case of vinyl chloride resins.

The vinyl chloride resin used in the present invention includes a vinyl chloride homopolymer and a copolymer comprising the aforesaid vinyl chloride monomer, which is used for graft polymerization on EPT elastomer, and a small amount of other monomer copolymerizable therewith.

The composition of the present invention can be obtained by mixing the aforesaid graft copolymer, vinyl chloride resin and stabilizer by means of a ribbon blender, a Henschel mixer or the like mixer used for vinyl chloride polymers, in general. If necessary, the composition may be incorporated with processing aids, pigments, fillers, etc.

The present invention is illustrated below with reference to examples, but the examples do not limit the scope of the invention. In the examples and comparative examples, all % and parts are by weight.

EXAMPLE 1

In a 300-liter autoclave, a mixture comprising 75 parts of vinyl chloride, 25 parts of an EPT elastomer (produced by Mitsubishi Yuka K.K.; ethylene content 75%, Nooney viscosity 45, ethylideneorbornene iodine value 15), 300 parts of water, 3 parts of Kalcohol 86 (produced by Kao Soap K.K.; main ingredient stearyl alcohol) and 0.2 part of lauroyl peroxide was stirred at 30° C. for 3 hours to dissolve the said elastomer in the vinyl chloride monomer. To the resulting solution was added an aqueous solution containing 0.2 part of polyvinyl alcohol, and the mixed solution was polymerized at 60° C. until the pressure lowered by 3.0 kg/cm$^2$ to obtain a white, homogeneous graft copolymer containing 29.0% of EPT. To 16 parts of the thus obtained copolymer were added 100 parts (4 wt% in terms of the amount of EPT elastomer in the resulting mixture) of a polyvinyl chloride resin (Nikavinyl SG 1100), and such additives as shown in Table 1, and the resulting mixture was blended at a high speed by means of a Henschel mixer to obtain a compound. This compound was subjected to pipe molding and to measurement using a Brabender plastograph.

Table 1

| Additives used | Parts |
| --- | --- |
| TVS No. 8813* | 0.2 |
| TVS No. 9931* | 0.3 |
| Calcium Stearate | 1.0 |
| Hoechst Wax-OP | 0.5 |
| Stearic acid | 0.2 |

*An Sn type stabilizer produced by Nitto Kasei K.K.

Pipe molding was carried out by using a 40 mm. extruder with a 25-mm. pipe die and a 40-mesh screen and a 80-mesh screen at L/D = 22, C.R. = 2.5. The measurement conditions of Brabender plastograph were as follows: Amount of charged compound 63 g., preheating 3 minutes, 185° C., 50 r.p.m.

The results obtained were as set forth in Table 2.

For comparison, the case where no alcohol was added at the time of polymerization, and the case where Kalcohol was added at the time of processing, are shown as Comparative Examples.

The conditions adopted in Comparative Examples were as follows:

Comparative Example 1

Entirely the same polymerization as in Example 1 was effected, except that the Kalcohol 86 was not used. The resulting product was treated in the same manner as in Example 1.

Comparative Example 2

The product of Comparative Example 1 was treated in the same manner as in Example 1, except that 0.5 part of Kalcohol No. 86 was further added to the blending agents shown in Table 1.

Table 2

| | Time of addition of Kalcohol | Physical properties of pipe | | | | Results of Brabender plastograph measurement | | Results of Geer's oven measurement (190° C) | Process-ability |
| --- | --- | --- | --- | --- | --- | --- | --- | --- | --- |
| | | Tensile strength (kg/cm$^2$) (at 15° C.) | Elongation(%) (at 15° C.) | Charpy impact valve (kg.cm/cm$^2$) (at 20° C.) | 50% Drop hammer destruction height (m) (at 20° C.) | Gelatin time (min) | Torque at the time of gelation (Kg.m) | Blackening time (min) | Pipe appearance |
| Example 1 | At the time of polymerization | 562 | 143 | 26.5 | 3.0 | 3.5 | 3.0 | 80 | Markedly excellent |
| Comparative Example 1 | Non-addition | 501 | 95 | 18.2 | 1.0 | 3.5 | 3.5 | 30 | Somewhat inferior |
| Comparative Example 2 | At the time of blending | 510 | 100 | 18.5 | 1.1 | 3.3 | 3.3 | 40 | Somewhat inferior |

(Note)
Tensile strength, elongation, Charpy impact value: JWWA-K-118 (Technical Standards determined by Japan Water Works Association)
50% Drop hammer destruction height: Measured according to UL (Underwriters'Laboratory) Standard; drop hammer weight 9.1 kg.

From Table 2, it is understood that the pipe obtained from the composition prepared in Example 1 is excellent in every one of appearance, physical properties and thermal stability, and particularly excellent in tensile strength and 50% drop-hammer strength, as compared with the pipe obtained from the composition prepared in Comparative Example 1. Such effects cannot be attained in Comparative Example 2, in which Kalcohol was added at the time of belnding. From the above, it is evident how prominent are the effects of the present invention. Examples 2–5 and Comparative Example 3.

The same polymerization, blending and test as in Example 1 were effected, except that alcohols other than the Kalcohol No. 86 were used. Since the products were somewhat different in EPT elastomer content from one another, the blending amount of each graft product was so controlled that the amount of EPT elastomer at the time of blending became 4 wt%. The results obtained were as set forth in Table 3.

Table 3

|  | Alcohol used | Physical properties of pipe | | | | Results of Brabender plastograph measurement | | Results of Geer's oven measurement (180° C.) | Processability |
|---|---|---|---|---|---|---|---|---|---|
|  |  | Tensle strength (kg/cm²) (at 15° C.) | Elongation (%) (at 15° C.) | Charpy impact valve (kg.cm/cm²) (at 20° C.) | 50% Drop-hammer destruction height (m) (at 20° C.) | Gelation time (min) | Torque at the time of gelation (kg.m) | Blackening time (min) | Pipe appearance |
| Example 2 | Kalcohol No. 20 [1] | 524 | 102 | 19.1 | 1.4 | 6.4 | 3.5 | 50 | Excellent |
| Example 3 | Kalcohol No. 42 [2] | 532 | 120 | 21.0 | 2.0 | 5.5 | 3.5 | 50 | Excellent |
| Example 4 | Kalcohol No. 68 [3] | 547 | 135 | 22.0 | 2.5 | 4.1 | 3.4 | 60 | Markedly excellent |
| Example 5 | Kalcohol No. 80 [4] | 551 | 140 | 22.5 | >3.0 | 3.7 | 3.1 | 70 | Markedly excellent |
| Comparative Example 3 | Pentanol | 502 | 95 | 18.3 | 1.0 | 6.5 | 3.6 | 30 | Somewhat inferior |

Note:
[1] Main ingredient: Lauryl alcohol
[2] Main ingredient: Myristyl alcohol
[3] Main ingredient: Palmityl alcohol
[4] Main ingredeint: Stearyl alcohol
All Kalcohols are trade names of alcohols commercially available from Kao Soap K.K.

As is clear from Table 3, a great improvement in physical properties is seen in the pipe obtained from the copolymer prepared by adding an alcohol of more than 12 carbon atoms at the time of polymerization, and the effect of addition of said alcohol is observed particularly in 50% drop-hammer strength. No substantial improvement can be attained when such a lower alcohol as in Comparative Example3 is added.

EXAMPLES 6-7

The graft copolymer obtained in Example 1 was subjected to the same blending and molding as in Example 1, except that the additives were replaced by each of such additives as shown in Tables 4 and 5. The results obtained were as set forth in Table 6.

| Example 6 (Pb type) Table 4 | | Example 7 (Ca-Zn type) Table 5 | |
|---|---|---|---|
| Additives | Parts | Additives | Parts |
| Tribasic lead sulfate | 1.5 | TMF 108P* | 2.5 |
| Dibasic lead stearate | 0.5 | Karen A-77** | 0.5 |
| Calcium Stearate | 0.2 |  |  |
| Stearate acid | 0.3 |  |  |

(Note)
*A Ca-Zn composite stabilizer produced by Tokyo Fine K.K.
**A lubricant produced by Tokyo Fine K.K.

Comparative Examples 4-5

The graft copolymer obtained in Comparative Example 1 was subjected to the same blending and molding as in Comparative Example 1, except that the additives were replaced by each of the additives shown in Tables 4 and 5. The results obtained were as set forth in Table 6.

Comparative Example 6

To 16 parts of the graft copolymer obtained in Comparative Example 1 were added 100 parts of a vinyl chloride resin (Nikavinyl SG 1100) and the additives shown in Table 1, and the resulting mixture was blended at a high speed by means of a Henschel mixer and then incorporated with 10 parts of Kane-Ace B 22 (MBS produced by Kanegafuchi Kagaku K.K.) to obtain a compound. This compound was subjected to the same pipe molding and Brabender plastograph measurement as in Example 1. The results obtained were as set forth in Table 6.

Comparative Example 7

Comparative Example 6 was repeated, except that the additives shown in Table 1 was replaced by the those shown in Table 4. The results obtained were as set forth in Table 6.

Table 6

|  | Kind of Stabiliser | Physical properties of pipe | | | | Results of Brabender Plastograph measurement | | Result of Geer's oven measurement (180° C.) | Processability |
|---|---|---|---|---|---|---|---|---|---|
|  |  | Tensile strength (kg/cm²) (at 15° C.) | Elongation (%) (at 15° C.) | Charpy impact value (kg.cm/cm²) (at 20° C.) | 50% Drop-hammer destruction height (m) (at 0° C.) | Gelation time (min) | Torque at the time of gelation (kg.m) | Blackening time (min) | Pipe appearance |
| Example 6 | Pb type | 572 | 145 | 27.1 | >3.0 | 8.5 | 2.8 | 150 | Markedly excellent |
| Example 1 | Sn type | 562 | 143 | 26.5 | >3.0 | 3.5 | 3.0 | 80 | Markedly excellent |
| Example 7 | Ca-Zn type | 557 | 125 | 25.3 | >3.0 | 4.0 | 2.9 | 70 | Excellent |
| Comparative Example 4 | Pb type | 545 | 130 | 22.1 | 2.5 | 10.2 | 3.2 | 140 | Excellent |
| Comparative Example 5 | Sn type | 512 | 90 | 19.0 | 1.2 | 6.5 | 3.5 | 70 | Somewhat inferior |
| Comparative Example 6 | Pb type | 561 | 150 | 25.5 | 2.6 | 12.5 | 3.2 | 130 | Markedly excellent |
| Comparative | Sn type | 492 | 165 | 17.5 | 1.2 | 1.5 | 4.8 | 50 | Somewhat |

Table 6-continued

| | | Physical properties of pipe | | | Results of Brabender Plastograph measurement | | Result of Geer's oven measurement (180° C.) | |
|---|---|---|---|---|---|---|---|---|
| Kind of Stabiliser | Tensile strength (kg/cm²) (at 15° C.) | Elongation (%) (at 15° C.) | Charpy impact value (kg.cm/cm²) (at 20° C.) | 50% Drop-hammer destruction height (m) (at 0° C.) | Gelation time (min) | Torque at the time of gelation (kg.m) | Blackening time (min) | Processability Pipe appearance |
| Example 7 | | | | | | | | inferior |

From Table 6, it is understood that in the case where MBS is used (Comparative Examples 6 and 7), the graft copolymer shows excellent processability when incorporated with a Pb type stabilizer and gives a pipe favorable in physical properties, but is deteriorated in processability when incorporated with an Sn type stabilizer and gives a pipe having no satisfactory physical properties, whereas in the case of the present invention (Examples 1,6 and 7), the graft copolymer is not deteriorated in processability even when incorporated with any of Sn and Ca-Zn type non-toxic stabilizers and can give a pipe that is excellent both in appearance and physical properties. It is also understood that when Kalcohol is not added at the time of polymerization (Comparative Examples 4 and 5), the resulting graft copolymer is inferior to the graft copolymer obtained according to the present invention, though even said graft copolymer is more excellent in processability than a graft copolymer prepared by use of MBS and incorporated with an Sn type stabilizer.

What we claim is:

1. An easily processable, and weather and impact-resistant vinyl chloride resin composition comprising a vinyl chloride resin and a vinyl chloride graft copolymer, said graft copolymer containing 10 – 60% by weight of an ethylene-propylene-diene terpolmer and resulting from suspension polymerization of a vinyl chloride monomer with said ethylene-propylene-diene terpolymer in an aqueous phase in the presence of an aliphatic alcohol having not less than 8 carbon atoms, there being 1 to 40% by weight of said terpolymer based on said composition.

2. The composition as claimed in claim 1 wherein said terpolymer is present in an amount of 2 – 30% by weight, based on the total weight of said composition.

3. The composition as claimed in claim 1, further including tin-type and/or Ca-Zn type stabilizers.

4. The composition as claimed in claim 1, wherein said terpolymer has a Mooney viscosity of 20 – 120, a propylene content of 20 – 50% by weight and a diene content of not more than 30 in terms of iodine value.

5. The composition as claimed in claim 1, wherein said alcohol is at least one member selected from lauryl alcohol, stearyl alcohol and palmityl alcohol.

6. A non-toxic, weather resistant and impact resistant pipe manufactured from the composition of claim 1.

* * * * *